(12) United States Patent
Li et al.

(10) Patent No.: US 7,293,481 B2
(45) Date of Patent: Nov. 13, 2007

(54) SINGLE-MOTOR POWER TELESCOPE AND TILT STEERING COLUMN

(75) Inventors: Xiaoyu Li, Saginaw, MI (US); Richard K. Riefe, Saginaw, MI (US); Scott A. Stinebring, Saginaw, MI (US); Melvin L. Tinnin, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 475 days.

(21) Appl. No.: 10/798,763

(22) Filed: Mar. 11, 2004

(65) Prior Publication Data

US 2005/0199087 A1 Sep. 15, 2005

(51) Int. Cl.
*B62D 1/18* (2006.01)

(52) U.S. Cl. .......................................... 74/493; 74/492

(58) Field of Classification Search .................. 74/492, 74/493, 575, 527, 529, 535, 536, 577 R, 74/577 M, 89.28; 280/775
See application file for complete search history.

(56) References Cited

U.S. PATENT DOCUMENTS

| | | | | | |
|---|---|---|---|---|---|
| 2,936,643 | A | * | 5/1960 | Smith et al. .................. | 74/409 |
| 4,793,204 | A | * | 12/1988 | Kubasiak ...................... | 74/493 |
| 4,972,732 | A | * | 11/1990 | Venable et al. ............... | 74/493 |
| 5,027,674 | A | * | 7/1991 | Nolte et al. .................... | 74/493 |
| 5,029,489 | A | * | 7/1991 | Burmeister et al. ........... | 74/493 |
| 5,222,410 | A | * | 6/1993 | Kinoshita ...................... | 74/493 |
| 5,363,716 | A | * | 11/1994 | Budzik et al. ................. | 74/493 |
| 5,452,624 | A | * | 9/1995 | Thomas et al. ................ | 74/493 |
| 5,524,927 | A | * | 6/1996 | Toussaint ...................... | 280/777 |
| 5,566,585 | A | * | 10/1996 | Snell et al. .................... | 74/493 |
| 5,820,163 | A | * | 10/1998 | Thacker et al. ............. | 280/775 |
| 5,979,265 | A | | 11/1999 | Kim et al. ...................... | 74/493 |
| 6,036,228 | A | * | 3/2000 | Olgren et al. ................. | 280/775 |
| 6,131,481 | A | * | 10/2000 | Wilson et al. ................. | 74/493 |
| 6,234,040 | B1 | | 5/2001 | Weber et al. ................. | 74/493 |
| 6,237,439 | B1 | | 5/2001 | Weber et al. ................. | 74/493 |
| 6,276,719 | B1 | | 8/2001 | Gärtner ...................... | 280/775 |
| 6,390,717 | B1 | * | 5/2002 | Bar ............................ | 403/104 |
| 6,460,427 | B1 | | 10/2002 | Hedderly ..................... | 74/493 |
| 6,623,036 | B2 | | 9/2003 | Yamamura et al. ......... | 280/775 |
| 2002/0124677 | A1 | * | 9/2002 | Tomaru et al. ............... | 74/493 |
| 2003/0222448 | A1 | * | 12/2003 | Arihara ....................... | 280/775 |
| 2004/0035238 | A1 | * | 2/2004 | Jolley et al. .................. | 74/493 |

FOREIGN PATENT DOCUMENTS

| | | | |
|---|---|---|---|
| JP | 02133280 A | * | 5/1990 |
| JP | 04024166 A | * | 1/1992 |

* cited by examiner

*Primary Examiner*—Thomas R. Hannon
*Assistant Examiner*—Terence Boes
(74) *Attorney, Agent, or Firm*—Michael D. Smith

(57) ABSTRACT

A drive mechanism is provided for a tilting and telescoping steering column. The drive mechanism can selectively tilt the steering wheel or telescope the steering column in response to input from the driver. A single drive mechanism controls the tilting movement and the telescoping movement. The invention includes a locking device for locking the single drive mechanism in one of first and second modes of operation corresponding to tilting movement and telescoping movement. A pivoting device for engaging the locking device is provided. The pivoting device can be a lever arm or can be a solenoid mounted to the steering column.

10 Claims, 8 Drawing Sheets

FIG. 8 is a detail view of a pivoting device for directing a locking arm in pivoting movement; and FIG. 9 is a side view of the pivoting device shown in FIG. 8.

SINGLE-MOTOR POWER TELESCOPE AND TILT STEERING COLUMN

FIELD OF THE INVENTION

The present invention relates to a tilting and telescoping steering column assembly for a vehicle and more specifically to a system for driving motion of the steering column.

BACKGROUND OF THE INVENTION

Vehicles can be equipped with steering columns that adjust the position of the steering wheel to enhance the comfort and safety of the driver. For example, the steering column can telescope to move closer to and away from the driver. Also, the position of the steering wheel can be tilted relative to other components of the column. These features together operate to enable the driver to adjust the steering wheel to a desired, convenient position for operating the vehicle, and for enabling the wheel to be moved out of the way to provide greater access to getting into and out of the driver's seat of the vehicle.

SUMMARY OF THE INVENTION AND ADVANTAGES

The present invention provides a single drive mechanism for controlling the telescoping movement of the steering column as well as the tilting movement of the steering column. The column includes a lower steering column jacket and an upper steering column jacket that move relative to one another in telescoping relation. The column also includes a tilt housing pivotally associated with the upper steering column jacket in tilting relation. The single drive mechanism of the present invention operates in a first mode for moving the tilt housing relative to the upper steering column jacket to tilt the steering wheel. The single drive mechanism also operates in a second mode for moving the upper steering column jacket relative to the lower steering column jacket. The invention also provides a locking mechanism to selectively lock the single drive mechanism in one of the first and second modes of operation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
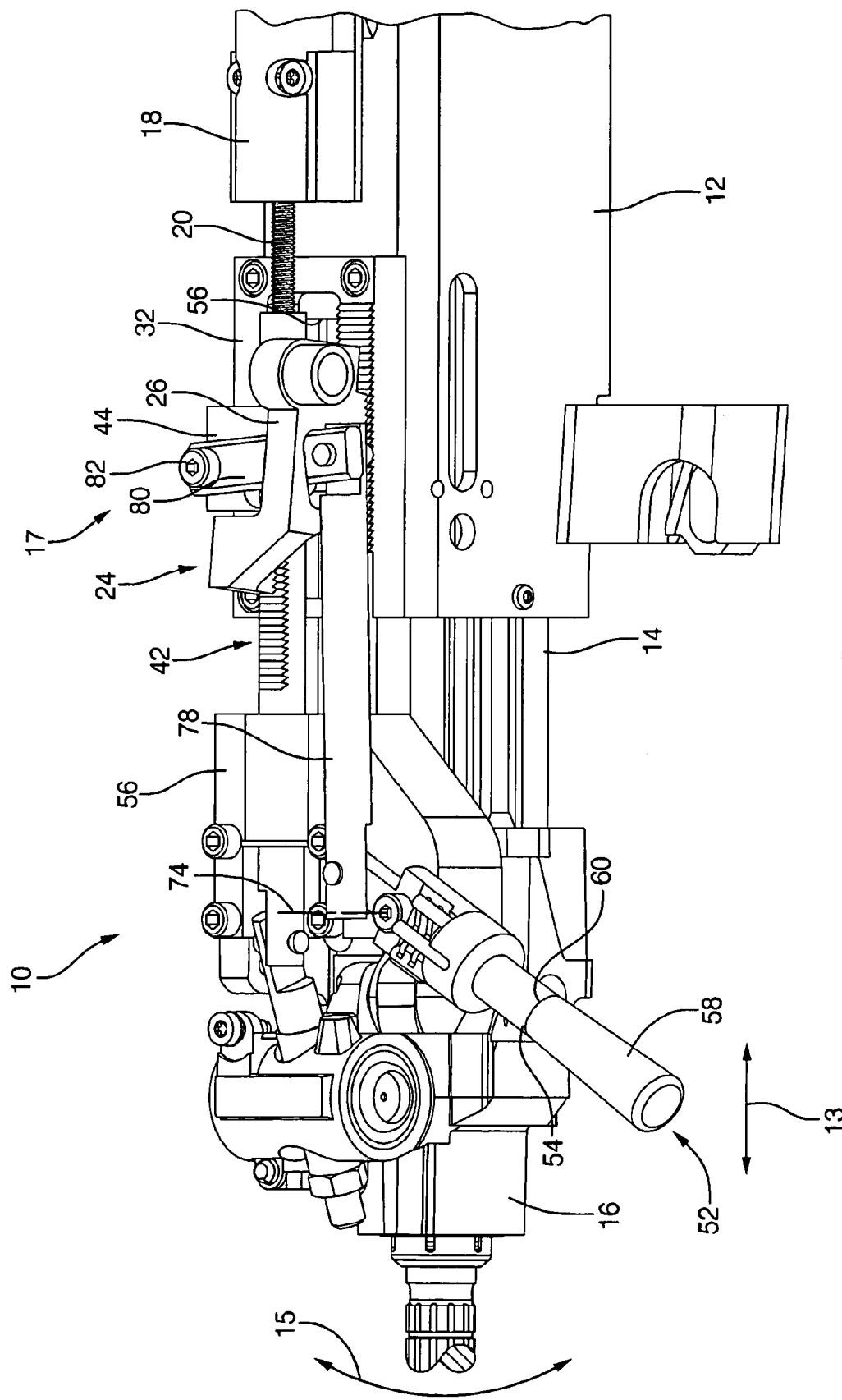
FIG. 1 is a perspective view of a first embodiment of a single drive mechanism according to the present invention.
Figure 2:
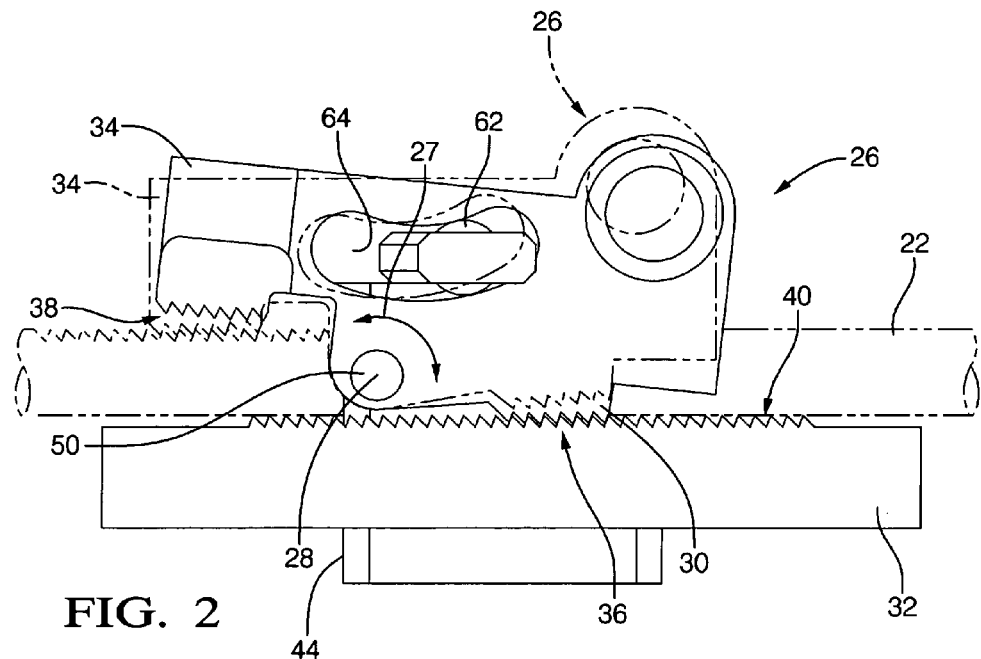
FIG. 2 is a detail view of a locking arm of the locking device shown in FIG. 1 wherein the locking arm is shown in first and second operating positions.

Referring now to FIGS. 1-4, the invention provides an apparatus 10 for adjusting the position of a steering wheel in a vehicle. The apparatus 10 includes a lower steering column jacket 12 for attachment to the vehicle. The apparatus 10 also includes an upper steering column jacket 14 engaged with said lower steering column jacket 12 for telescoping movement 13 for supporting a steering wheel in a desired longitudinal position relative to the lower steering column jacket 12. The apparatus 10 also includes a tilt housing 16 engaged with the upper steering column jacket 14 for tilting movement 15 for supporting the steering wheel in a desired angular position relative to the upper steering column jacket 14. The apparatus 10 also includes a single drive mechanism 17 for controlling the telescoping movement 13 and the tilting movement 15.

In the exemplary embodiment of the invention, the single drive mechanism 17 operates in a first mode of operation for moving the tilt housing 16 in tilting movement 15 relative to the upper steering column jacket 14. The single drive mechanism 17 also operates in a second mode of operation in the exemplary embodiment for moving the upper steering column jacket 14 in telescoping movement 13 relative to the lower steering column jacket 12. The single drive mechanism 17 shown in FIGS. 1-4 includes a motor 18 at a shaft 20 driven in rotation by the motor 18. The motor 18 is fixedly connected to the lower steering column jacket 12. The single drive mechanism 17 also includes a member 22 operably associated with the motor shaft 20 such that the member 22 moves linearly in response to rotation of the motor shaft 20.

In the exemplary embodiment of the invention, the member 22 encircles the motor shaft 20 and cooperates with the motor shaft 20 in a screw-drive relationship. In an alternative embodiment of the invention, the member 22 could include a worm gear engageable with a corresponding worm gear formed on the motor shaft 20. The member 22 is pivotally connected to the tilt housing 16. Linear movement of the member 22 directs the tilt housing 16 to move in tilting movement 15. In the first mode of operation, the motor 18 rotates the motor shaft 20, resulting in linear movement of the member 22 and tilting movement 15 of the tilt housing 16 relative to the upper steering column jacket 14.

In the second mode of operation of the single drive mechanism 17, the motor 18 rotates the motor shaft 20 which results in linear movement of the member 22 and telescoping movement 13 of the upper steering column jacket 14 relative to the lower steering column jacket 12. Also, during the second mode of operation, the upper steering column jacket 14 is fixedly associated with the member 22. In other words, the tilt housing 16, the upper steering column jacket 14, and the member 22 translate or move concurrently in response to rotation of the motor shaft 20.

The invention also provides a locking device 24 for locking the single drive mechanism 17 in one of the first and second modes of operation. The locking device 24 is substantially fixed to the upper steering column jacket 14 and selectively engages the member 22 to lock the single drive mechanism 17 in the second mode of operation. The locking device 24 includes a locking arm 26 engaged for pivoting movement 27 with the upper steering column jacket 14. The locking arm 26 moves in pivoting movement 27 about a pivot axis 28. In the exemplary embodiment of the invention, the pivot axis 28 is disposed between the first and second fingers 30, 34. The locking arm 26 is pivotable between a tilting-locked position, shown in phantom in FIG. 2, and a telescoping-locked position shown in solid line in FIG. 2. When the locking arm is in the tilting-locked position, the tilt housing 16, the upper steering column jacket 14, and the member 22 translate or move concurrently in response to rotation of the motor shaft 20. When the locking arm is in the telescoping-locked position, upper steering column jacket 14 does not move and the tilt housing 16 moves in tilting movement 15 relative to the upper steering column jacket 14.

The locking arm 26 includes a first finger 30 engageable with the lower steering column jacket 12 when the locking arm 26 is in the telescoping-locked position. In the exemplary embodiment of the invention, a member 32 is positioned on the lower steering column jacket 12 for engaging the first finger 30 of the locking arm 26. The height of the member 32 can be adjusted in response to the operating environment of the steering column. For example, the locking arm 26 could be used in several different operating environments and the member 32 can be formed in different sizes, each size corresponding to a different operating environment.

The locking arm 26 also includes a second finger 34 engageable with the member 22 when the locking arm 26 is in the tilting-locked position. Each of the first and second fingers 30, 34, the lower steering column jacket 12 or member 32, and the member 22 respectively define mating teeth 36, 38, 40, 42 to engage one another when the locking arm is in one of the telescoping-locked position and the tilting-locked position.

The apparatus 10 also includes a slide block 44 extending from the upper steering column jacket 14 for supporting the locking arm 26 for pivoting movement 27. The side block 44 includes a pin portion 50 that defines the pivot axis 28. The pin portion 50 extends transverse to the upper steering column jacket 14. The lower steering column jacket 12 defines a slot 46 and the slide block 44 extends through the slot 46 and through the member 32. When the single drive mechanism 17 is in the second mode of operation, the mating teeth 38 of the second finger 34 lockingly engages the mating teeth 42 defined on an outer surface of the member 22 and linear motion of the member 22 is communicated through the mating teeth 38, 42, to the second finger 34 of the locking arm 26, and to the pin portion 50 of the slide block 44 to the upper steering column jacket 14.

Figure 3:
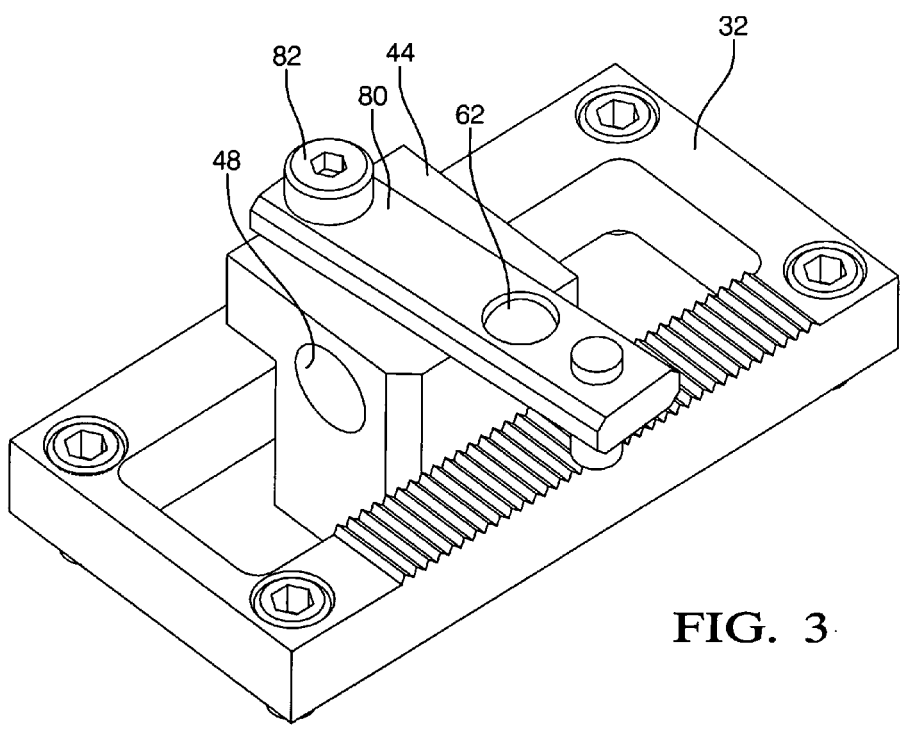
FIG. 3 is a partially exploded view showing a slide block and a cam portion of the locking device shown in FIGS. 1 and 2.
Figure 4:
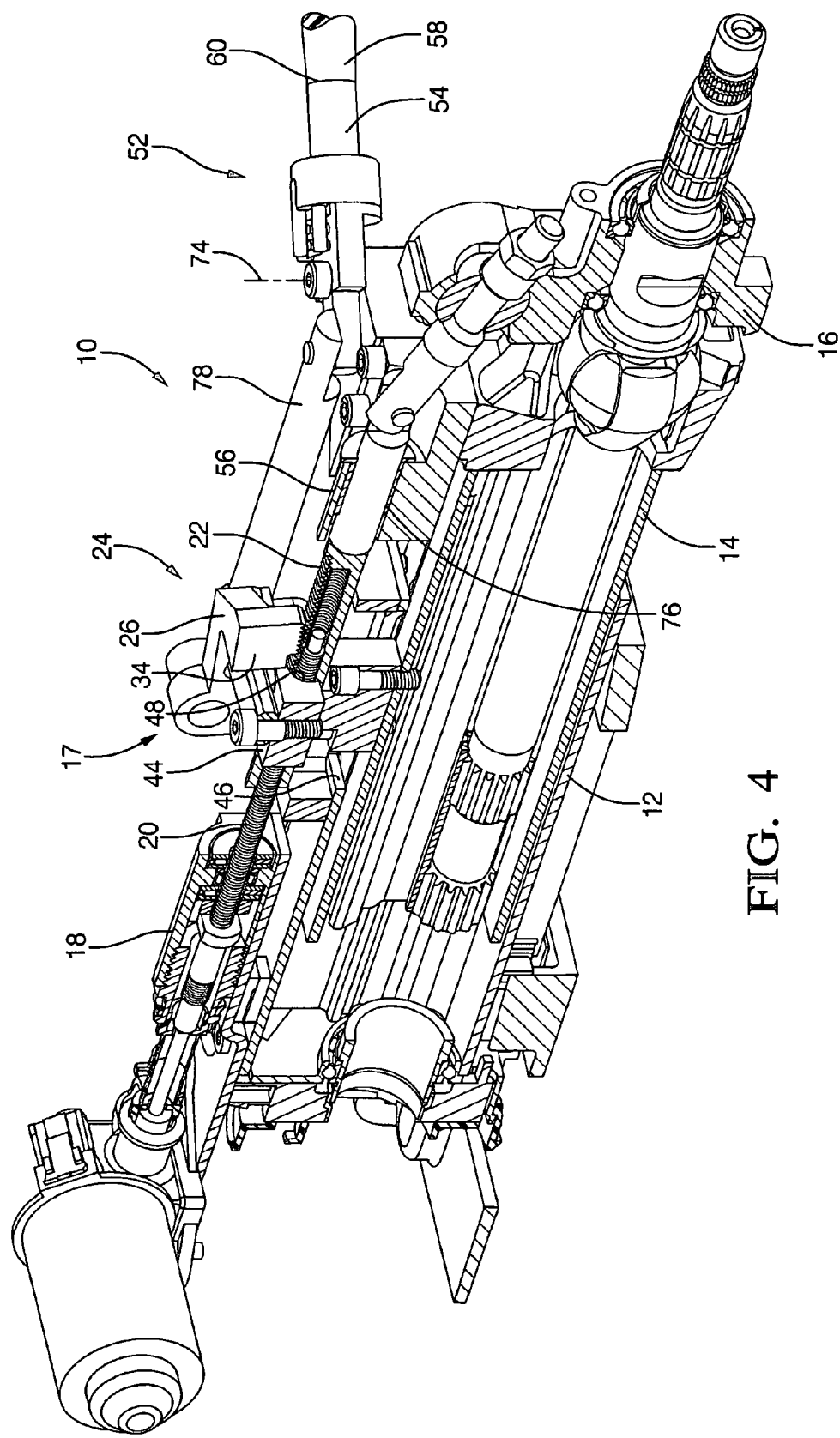
FIG. 4 is a cross-sectional view of the first embodiment of the invention shown in FIGS. 1-3.
Figure 5:
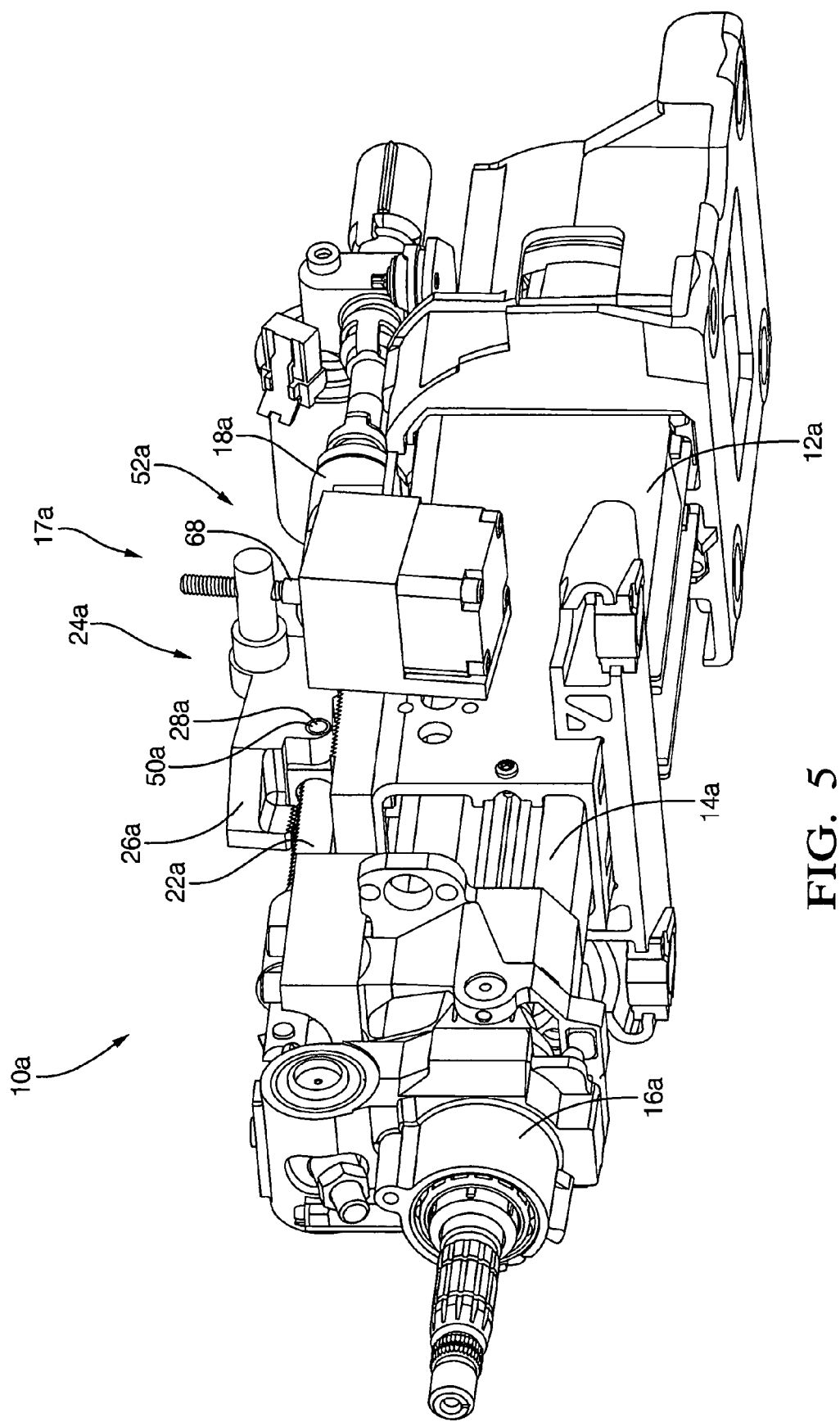
FIG. 5 is a perspective view of a second embodiment of the invention.
Figure 6:
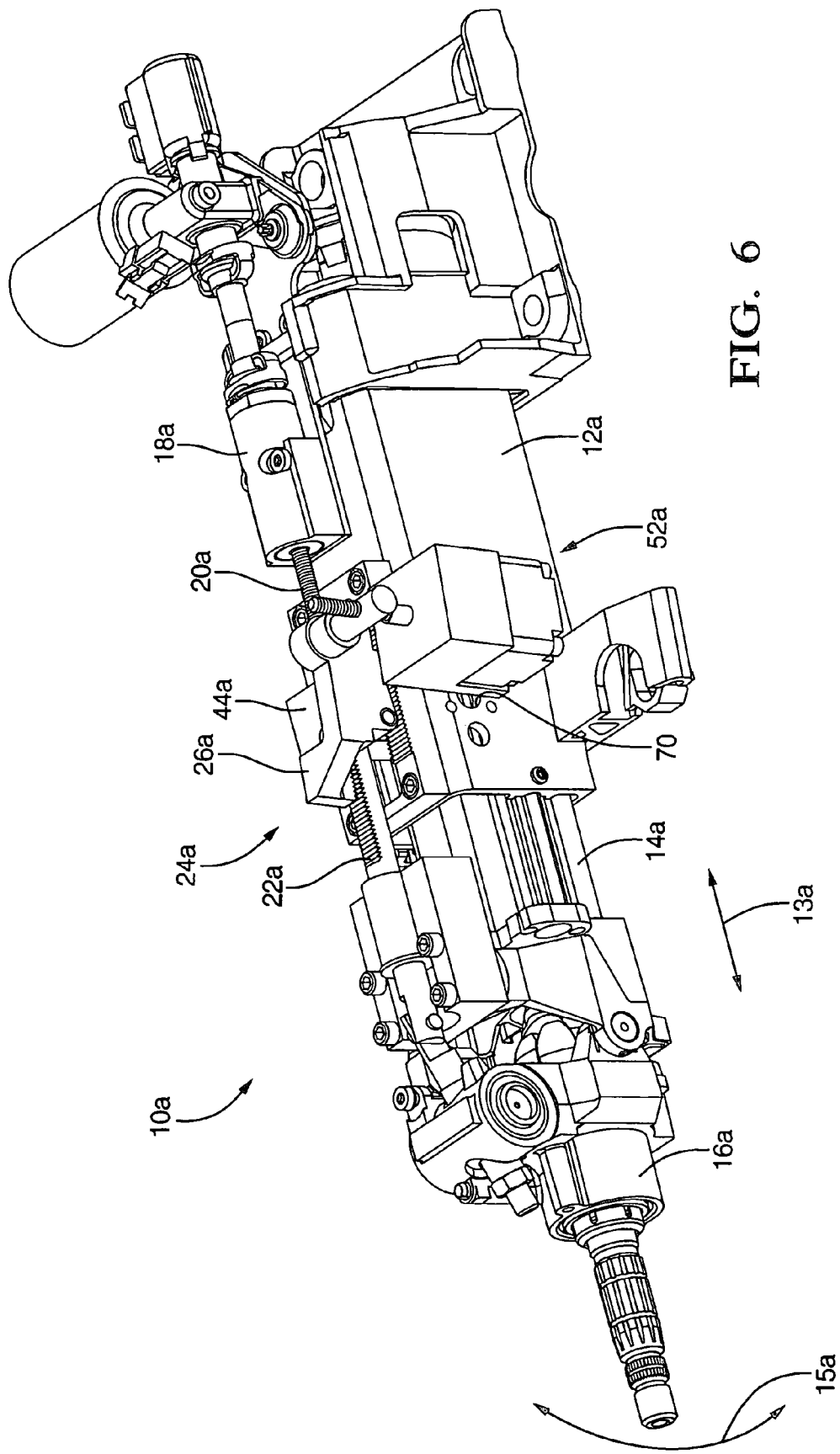
FIG. 6 is a second perspective view of the second embodiment of the invention.
Figure 7:
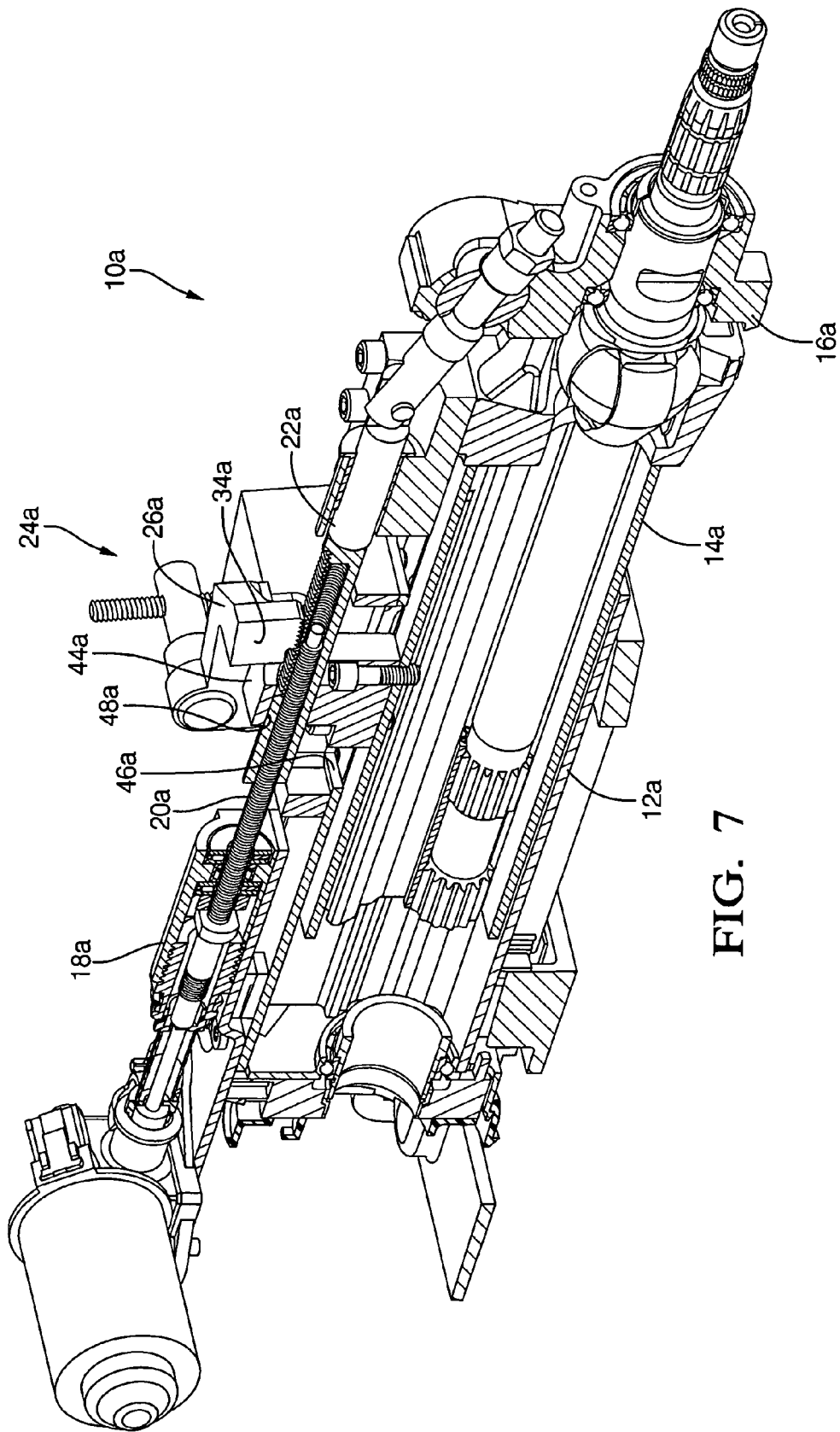
FIG. 7 is a cross-sectional view of the second embodiment of the invention shown in FIGS. 5 and 6.
Figure 8:
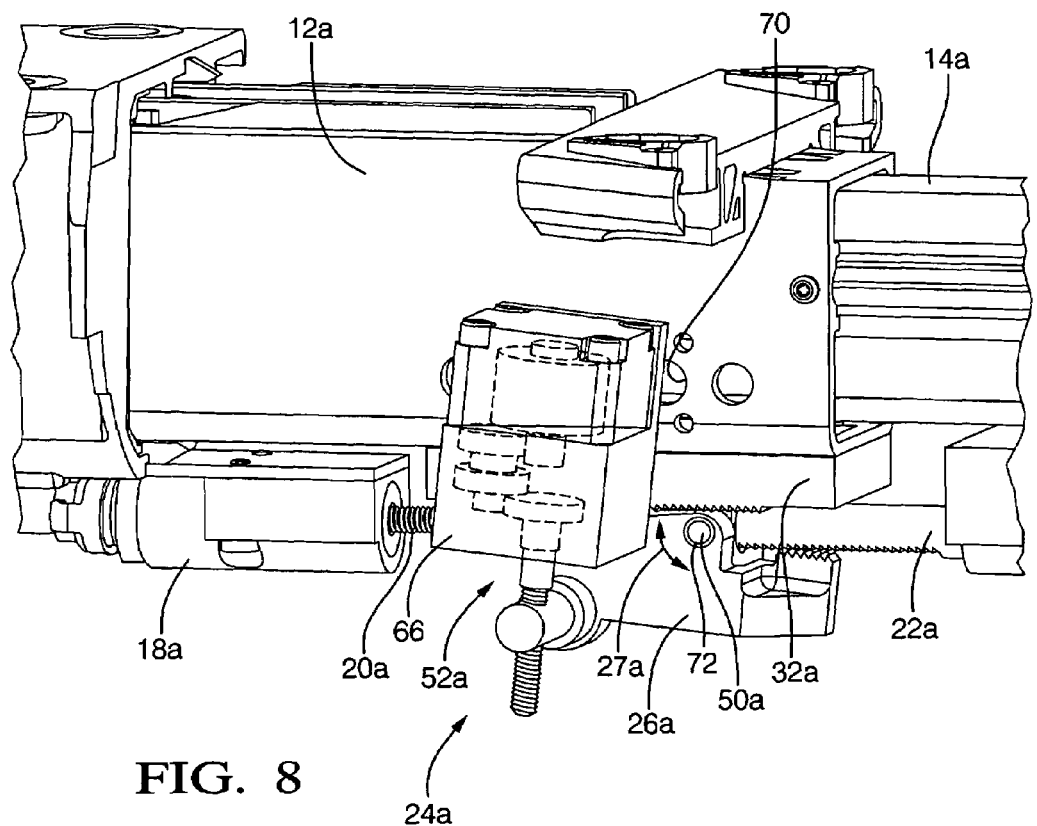
Figure 9:
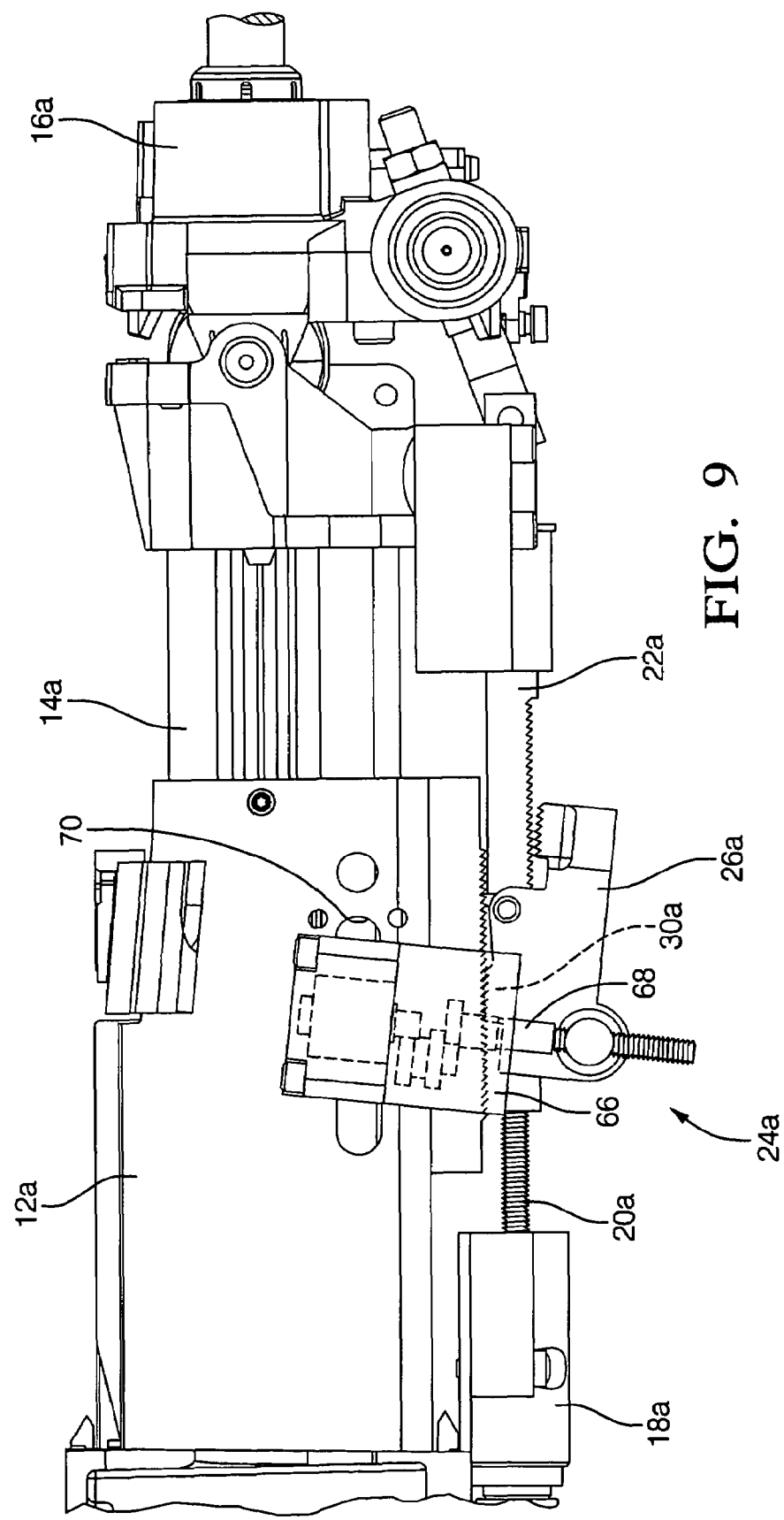

As shown in FIG. 3 of the exemplary embodiment of the invention, the slide block 44 defines an aperture 48. The member 22 extends through the aperture 48 between engagement with the motor shaft 20 and the tilt housing 16. The engagement between the member 22 and the aperture 48 enhances the compactness of the apparatus 10.

As shown in the alternative embodiment of the invention shown in FIG. 5-9, a resilient member 72 can be disposed between the locking arm 26a and the pin portion 50a to increase the robustness of the locking device 24a. For example, when the mating teeth of the locking arm 26a and the member 22a engage tip-to-tip, the resilient member 72 can deform slightly to enhance the likelihood that the mating teeth will snap firmly into engagement with one another.

The apparatus 10 of the exemplary embodiment of the invention also includes a pivoting device 52 operably associated with the locking device 24 to direct pivoting movement 27 of the locking arm 26 between the tilting-locked position and the telescoping-locked position. The pivoting device 52 includes a lever arm 54 pivotably associated with the upper steering column jacket 14 adjacent to the tilt housing 16. The lever 54 is manipulated by the driver of the vehicle. The lever arm 54 pivots about a pivot pin 74 fixedly associated with a member 56. The member 56 is disposed between the tilt housing 16 and the upper steering column jacket 14. The member 56 defines an aperture 76 and the member 22 passes through the aperture 76. The lever arm 54 is connected to a linking member 78 and a second linking member 80. Pivoting movement of the lever arm 54 about the pivot pin 74 results in movement of the second linking member 80 about a second pivot pin 82. The second linking member 80 supports a cam portion 62 positionable in a slot 64 defined by the locking arm 26. The cam portion 62 and the slot 64 cooperate in a cam-cam follower relationship to direct the locking arm 26 in the pivoting movement 27.

For example, in response to the lever arm 54 being pulled toward the tilt housing and driver as shown in FIG. 1, the linking member 78 moves toward the lower steering column jacket 12, the second linking member 80 rotates about the pin 82 toward the lower steering column jacket 12, and the locking arm 26 moves to the telescoping-locked position wherein the teeth 36 of the finger 30 engage the teeth 40 of the member 32. Also, for example, in response to the lever arm 54 being moved away from the tilt housing 16, the linking member 78 is moved closer to the tilt housing 16, the second linking member 80 rotates about the pin 82 away from the lower steering column jacket 12, and the locking arm 26 moves to the tilting-locked position wherein the teeth 38 of the finger 34 engage the teeth 42 of the member 22. The lever arm 54 can be biased to the position shown in FIG. 1 in operating environments wherein the steering is most often adjusted in tilting movement 27.

A switch 58 is rotatably positioned at an end 60 of the lever arm 54. The switch 58 can communicate with the motor 18 to selectively engage the motor 18 to rotate the shaft 20. The shaft 20 is rotated clockwise or counterclockwise in response to rotation of the switch 58. For example, turning the switch 58 counter-clockwise can correspond to counter-clockwise rotation of the shaft 20 or vice-versa.

In one example of the operation of the first embodiment of the invention, a driver positioned in a vehicle including the apparatus 10 of the present invention can, for example, rotate the switch 58 in a clockwise direction to direct the motor 18 to rotate the shaft 20 and linearly move the member 22. When the locking arm 26 is in the telescoping-locked position, linear movement of the member 22 will tilt the tilt housing 16 relative to the upper steering column jacket 14 in an upwardly tilting direction. Alternatively, the driver can rotate the switch 58 in a counterclockwise direction to direct the motor 18 to rotate the shaft 20 in a counterclockwise direction and tilt the tilt housing 16 in a downward direction relative to the upper steering column jacket 14.

When the driver of the vehicle desires to adjust the telescopic position of the steering wheel, the lever arm 54 is moved to move the locking arm 26 to the tilting-locked position. After moving the lever arm 54, the driver can rotate the switch 58 to direct the motor 18 to rotate the shaft 20 and linearly move the member 22. When the locking arm is in the tilting-locked position, linear movement of the member 22 will result in concurrent linear movement of the tilt housing 16 and the upper steering column jacket 14.

Referring now to FIGS. 5-9, an alternative embodiment of the invention includes an apparatus 10a for adjusting the position of a steering wheel in a vehicle. The apparatus 10a includes a lower steering column jacket 12a for attachment to the vehicle. The apparatus 10a also includes an upper steering column jacket 14a engaged with the lower steering column jacket 12a for telescoping movement 13a for supporting the steering wheel in a desired longitudinal position relative to the lower steering column jacket 12a. The apparatus 10a also includes a tilt housing 16a engaged with the upper steering column jacket 14a for tilting movement 15a for supporting the steering wheel in a desired angular position relative to the upper steering column jacket 14a. The apparatus 10a also includes a single drive mechanism 17a for controlling the telescoping movement 13a and the tilting movement 15a.

The apparatus 10a is substantially similar to the apparatus 10 shown in FIGS. 1-4. For example, the single drive mechanism 17a includes a motor 18a for rotating a motor shaft 20a. The member 22a is pivotally connected to the tilt housing 16a and encircles the motor shaft 20a. The member 22a is linearly moveable in response to rotation of the shaft 20a. The apparatus 10a includes the locking device 24a including the locking arm 26a engaged with the upper steering column jacket 14a for pivoting movement 27a. The locking arm 26a pivots about a pivot axis 28a defined by a pin portion 50a of a slide block 44a. The locking arm 26a includes first and second fingers 30a, 34a for engaging a member 32a associated with the lower steering column jacket 12a and the member 22a, respectively. The slide block 44a is fixedly associated with the upper steering column jacket 14a and extends through a slot 46a defined by the lower steering column jacket 12a. The slide block 44a defines an aperture 48a for supporting linear movement of the member 22a.

The apparatus 10a includes a pivoting device 52a for directing the locking arm 26a in pivoting movement 27a. The device 52a includes solenoid 66 having a rod 68 movable between an extended position and a retracted position. The extended and retracted positions of the rod 68 correspond to telescoping-locked and tilting-locked positions of the locking arm 26a. The solenoid 66 is substantially fixedly associated with respect to the upper steering column jacket 14a. For example, the solenoid 66 moves linearly in response to telescoping movement of the upper steering column jacket 14a. The solenoid 66 can rotate relative to the upper steering column jacket 14a when the rod 68 moves between the extended and retracted positions. The solenoid 66 is connected to the upper steering column jacket 14a through a slot 70 defined by the lower steering column jacket 12a. Switches for controlling for the motor 18a and the solenoid 66 can be disposed on the dashboard of the vehicle.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for adjusting the position of a steering wheel in a vehicle comprising:
   a lower steering column jacket for attachment to the vehicle;
   an upper steering column jacket engaged telescopically with said lower steering column jacket for telescoping movement for supporting a steering wheel in a desired longitudinal position relative to said lower steering column jacket;
   a tilt housing engaged pivotally with said upper steering column jacket for tilting movement for supporting the steering wheel in a desired angular position relative to said upper steering column jacket;
   a single drive mechanism for controlling said telescoping movement and said tilting movement;
   wherein said single drive mechanism includes a first mode of operation for moving said tilt housing in said tilting movement relative to said upper steering column jacket and a second mode of operation for moving said upper steering column jacket in said telescoping movement relative to said lower steering column jacket;
   wherein said single drive mechanism includes a single locking device for locking said single drive mechanism in one of said first mode of operation and said second mode of operation;
   wherein said single drive mechanism includes a member pivotally connected to said tilt housing to direct said tilt housing in said tilting movement;
   wherein said locking device selectively engages said member to lock said single drive mechanism in said second mode of operation;
   wherein said locking device is further defined as being supported by and fixed to said upper steering column jacket;
   wherein said single drive mechanism includes a motor fixedly connected to said lower steering column jacket;
   wherein said motor includes a rotatable shaft and said member moves linearly in response to rotation of said shaft; and
   wherein said member encircles said shaft.

2. An apparatus for adjusting the position of a steering wheel in a vehicle comprising:
   a lower steering column jacket for attachment to the vehicle;
   an upper steering column jacket engaged telescopically with said lower steering column jacket for telescoping movement for supporting a steering wheel in a desired longitudinal position relative to said lower steering column jacket;
   a tilt housing engaged pivotally with said upper steering column jacket for tilting movement for supporting the steering wheel in a desired angular position relative to said upper steering column jacket;
   a single drive mechanism for controlling said telescoping movement and said tilting movement;
   wherein said single drive mechanism includes a first mode of operation for moving said tilt housing in said tilting movement relative to said upper steering column jacket and a second mode of operation for moving said upper steering column jacket in said telescoping movement relative to said lower steering column jacket;
   wherein said single drive mechanism includes a single locking device for locking said single drive mechanism in one of said first mode of operation and said second mode of operation;

wherein said single drive mechanism includes a member pivotally connected to said tilt housing to direct said tilt housing in said tilting movement;

wherein said locking device selectively engages said member to lock said single drive mechanism in said second mode of operation;

wherein said locking device is further defined as being supported by and fixed to said upper steering column jacket;

wherein said single drive mechanism includes a motor fixedly connected to said lower steering column jacket;

wherein said motor includes a rotatable shaft and said member moves linearly in response to rotation of said shaft;

wherein said locking device includes a single locking arm engaged for pivoting movement with said upper steering column jacket between a tilting-locked position and a telescoping-locked position; and wherein said locking arm includes a pivot axis associated with said pivoting movement and a first finger engageable with said lower steering column jacket when said locking arm is in said telescoping-locked position and a second finger engageable with said member when said locking arm is in said tilting-locked position.

3. The apparatus of claim 2 wherein said pivot axis is disposed between said first and second fingers.

4. The apparatus of claim 2 wherein each of said first and second fingers and said member and said lower steering column jacket respectively carry mating teeth to engage one another.

5. An apparatus for adjusting the position of a steering wheel in a vehicle comprising:

a lower steering column jacket for attachment to the vehicle;

an upper steering column jacket engaged telescopically with said lower steering column jacket for telescoping movement for supporting a steering wheel in a desired longitudinal position relative to said lower steering column jacket;

a tilt housing engaged pivotally with said upper steering column jacket for tilting movement for supporting the steering wheel in a desired angular position relative to said upper steering column jacket;

a single drive mechanism for controlling said telescoping movement and said tilting movement;

wherein said single drive mechanism includes a first mode of operation for moving said tilt housing in said tilting movement relative to said upper steering column jacket and a second mode of operation for moving said upper steering column jacket in said telescoping movement relative to said lower steering column jacket;

wherein said single drive mechanism includes a single locking device for locking said single drive mechanism in one of said first mode of operation and said second mode of operation;

wherein said single drive mechanism includes a member pivotally connected to said tilt housing to direct said tilt housing in said tilting movement;

wherein said locking device selectively engages said member to lock said single drive mechanism in said second mode of operation;

wherein said locking device is further defined as being supported by and fixed to said upper steering column jacket;

wherein said single drive mechanism includes a motor fixedly connected to said lower steering column jacket;

wherein said motor includes a rotatable shaft and said member moves linearly in response to rotation of said shaft;

wherein said locking device includes a single locking arm engaged for pivoting movement with said upper steering column jacket between a tilting-locked position and a telescoping-locked position; and wherein said locking device includes a slide block extending from said upper steering column jacket and supporting said locking arm for said pivoting movement.

6. The apparatus of claim 5 wherein said lower steering column jacket defines a slot and said slide block extends through said slot.

7. The apparatus of claim 6 wherein slide block defines an aperture and said member extends through said aperture.

8. The apparatus of claim 6 including a resilient member disposed between said slide block and said locking arm.

9. The apparatus of claim 6 wherein said slide block includes a pin portion extending transverse to said upper steering column jacket wherein said locking arm being supported by said pin portion for said pivoting movement.

10. An apparatus for adjusting the position of a steering wheel in a vehicle comprising:

a lower steering column jacket for attachment to the vehicle;

an upper steering column jacket engaged with said lower steering column jacket for telescoping movement for supporting a steering wheel in a desired longitudinal position relative to said lower steering column jacket;

a tilt housing engaged with said upper steering column jacket for tilting movement for supporting the steering wheel in a desired angular position relative to said upper steering column jacket;

a single drive mechanism for controlling said telescoping movement and said tilting movement;

wherein said single drive mechanism includes;

a first mode of operation for moving said tilt housing in said tilting movement relative to said upper steering column jacket and a second mode of operation for moving said upper steering column jacket in said telescoping movement relative to said lower steering column jacket, a locking device for locking said single drive mechanism in one of said first mode of operation and said second mode of operation, a member pivotally connected to said tilt housing to direct said tilt housing in said tilting movement, and a motor fixedly connected to said lower steering column jacket;

wherein said locking device selectively engages said member to lock said single drive mechanism in said second mode of operation;

wherein said locking device is further defined as being substantially fixed to said upper steering column jacket;

wherein said motor includes a rotatable shaft and said member moves linearly in response to rotation of said shaft;

wherein said locking device includes a locking arm engaged for pivoting movement with said upper steering column jacket between a tilting-locked position and a telescoping-locked position; and wherein said pivoting device includes a cam portion and said locking arm defines a slot cooperating with said cam portion as a cam-follower to direct said locking arm in said pivoting movement.

* * * * *